Dec. 23, 1958   M. E. BOURNS ET AL   2,866,052
ELECTRIC DIGITAL READOUT DEVICE

Filed Nov. 10, 1955   5 Sheets-Sheet 1

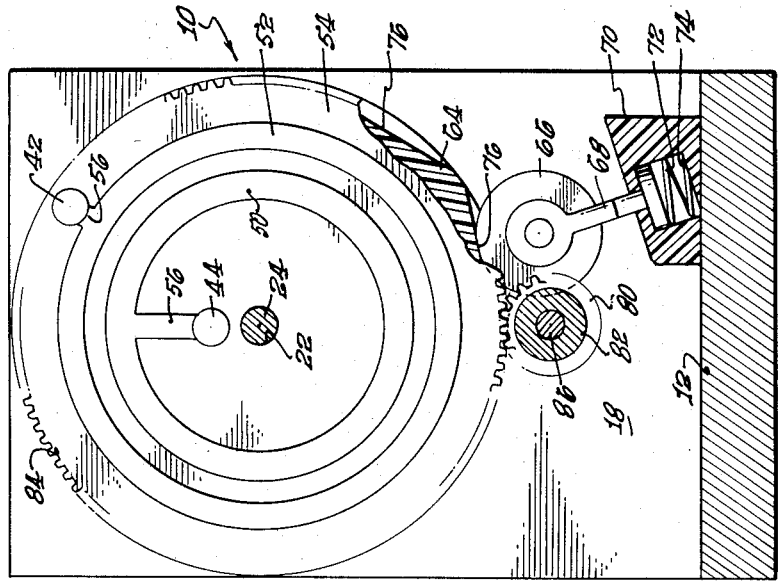
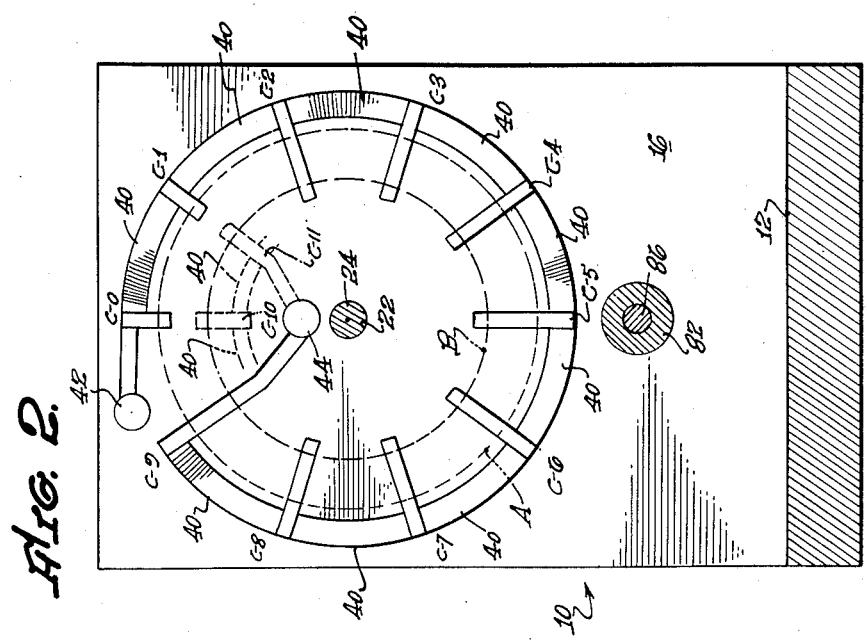

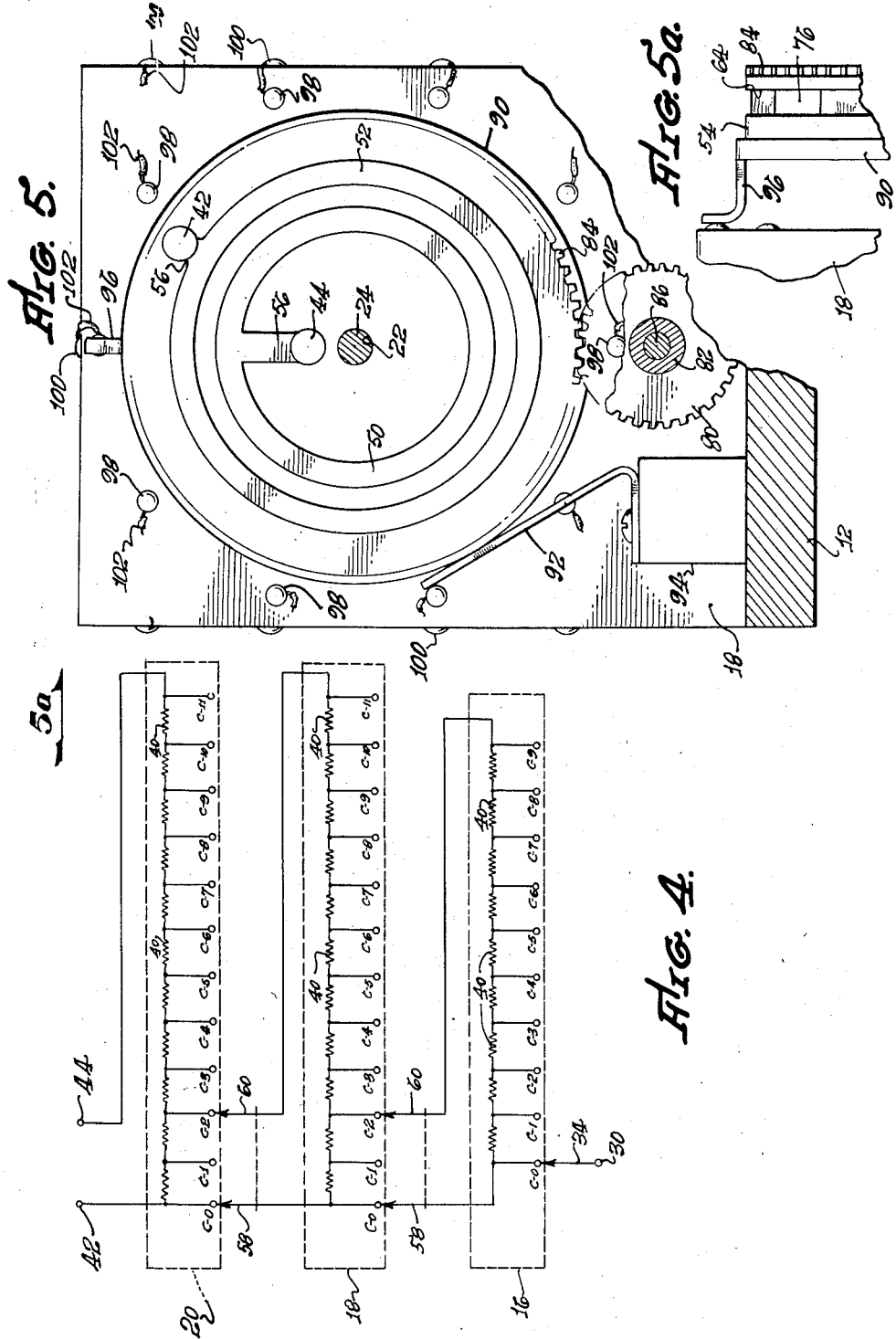

Dec. 23, 1958  M. E. BOURNS ET AL  2,866,052
ELECTRIC DIGITAL READOUT DEVICE
Filed Nov. 10, 1955  5 Sheets-Sheet 4
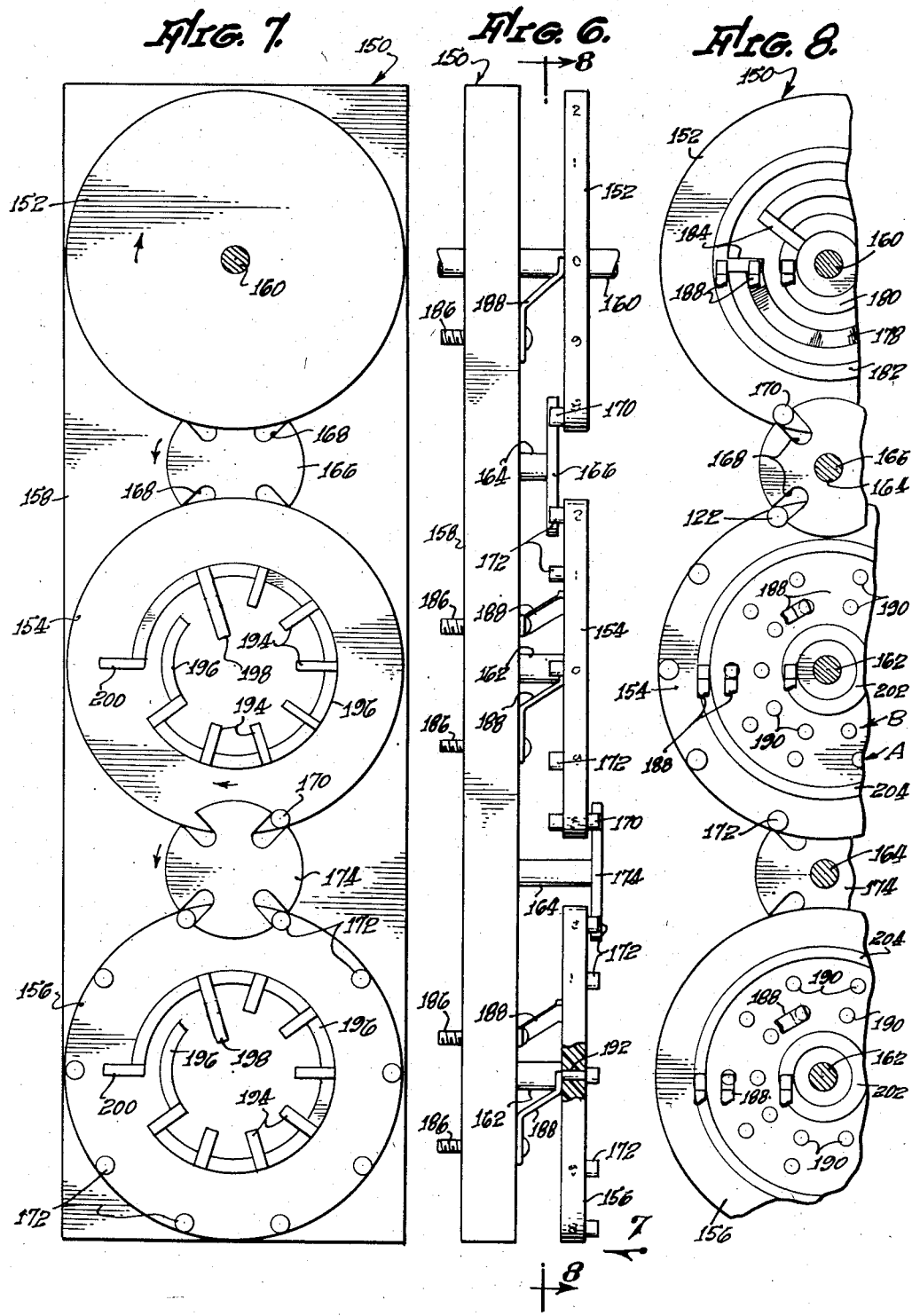

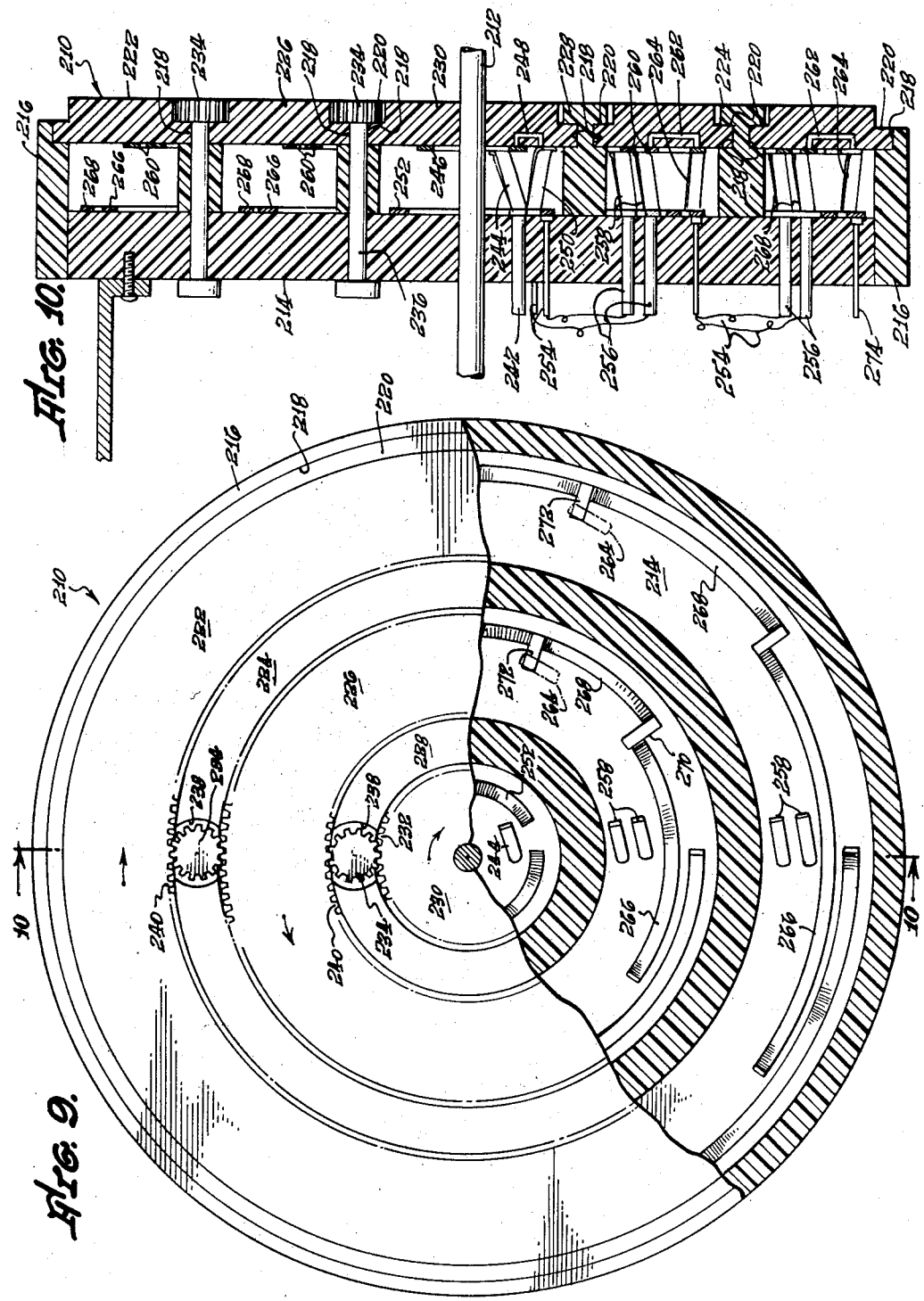

2,866,052

ELECTRIC DIGITAL READOUT DEVICE

Marlan E. Bourns, Riverside, and Edward D. O'Brian, Anaheim, Calif., assignors to Bourns Laboratories, Inc.

Application November 10, 1955, Serial No. 546,106

8 Claims. (Cl. 201—43)

The present invention relates to a new and improved digital readout device.

It is known to calibrate potentiometers by connecting the end terminals of a potentiometer being calibrated in parallel with a known highly accurate potentiometer, and connecting the movable contacts or wipers of both the known and the unknown potentiometers to apparatus which serves to adjust the position of the movable contact on the known potentiometer in accordance with the position of the movable contact on the potentiometer being calibrated until no current flows from the movable contacts of both instruments, and to adjust an appropriate device serving to indicate the position of the movable contact in the known potentiometer. With this procedure both the indicator or readout apparatus and the known potentiometer are separate pieces of equipment, and they must be linked or connected together, normally by mechanical means.

It is an object of the invention to provide a digital readout device in which a reference potentiometer and an indicating apparatus are combined into a single piece of equipment so as to eliminate various mechanical or other linkages such as are known in the prior art constructions. Another object is to teach the construction of highly accurate, compact digital devices of the class described. A further object is to provide digital devices of the class described which are comparatively easy to manufacture, and which can be easily operated.

Although the above discussion would indicate that this invention is limited to digital readout devices capable of being used solely to calibrate potentiometers, this is not the case. Apparatus constructed as herein described can be employed for a variety of purposes with either A. C. or D. C. current. As an example of such other applications of the invention, digital devices, as described in this specification, can be employed in computers and other similar equipment to convert a quantity such as an amount of shaft rotation, into a digital output. With the invention the amount of the digital output may be determined directly by visual inspection.

Further objects of this invention and many advantages of it, as well as many applications of it, will be apparent to those skilled in the field to which it pertains from a consideration of the remainder of this specification including the appended claims and the accompanying drawings in which:

Fig. 2 is a cross-sectional view taken at line 2—2 of Fig. 1;

Fig. 3 is a cross-sectional view taken at line 3—3 of Fig. 1;

Fig. 4 is an electrical schematic view of the digital readout device shown in Fig. 1; and Figure 5a shows readout details.

Fig. 5 is a cross-sectional view similar to Fig. 2 of a modified digital readout device of the invention;

Fig. 6 is a side elevational view of a modified digital readout device of this invention;

Fig. 7 is a top elevational view of the modified device shown in Fig. 6;

Fig. 8 is a partial cross-sectional view taken at line 8—8 of Fig. 6;

Fig. 9 is a top elevational view, partially in section, of a second modified digital readout device of this invention; and Fig. 10 is a cross-sectional view taken at line 10—10 of Fig. 9.

Figure 1:
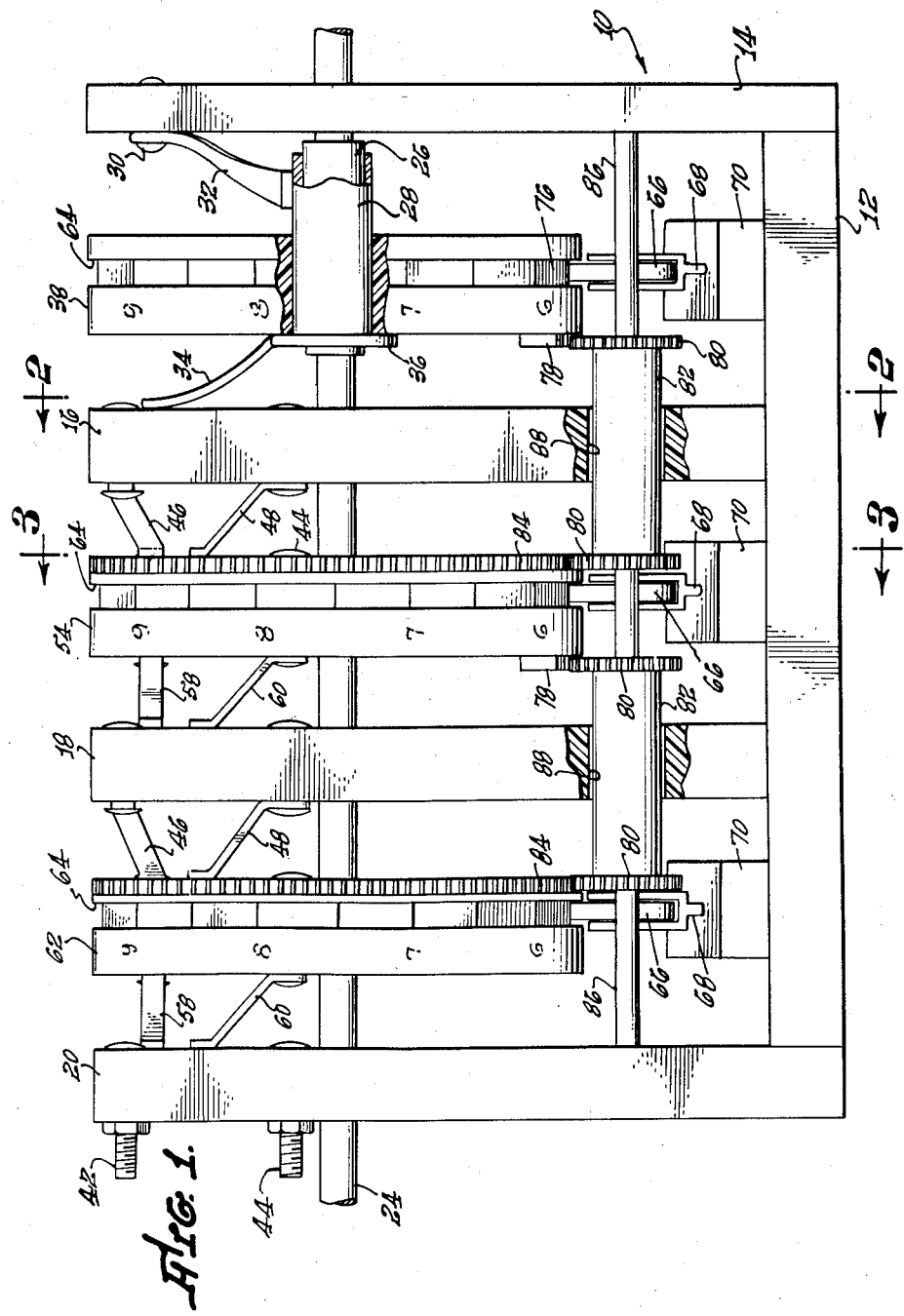
Fig. 1 is a side elevational view, partially in section, of a digital readout device of the instant invention.

In all figures of the drawings like numerals are used to designate like parts wherever convenient for purposes of illustration and explanation. It is to be understood that no attempt is made in the accompanying drawings to illustrate the exact details of a commercial embodiment of the invention drawn to scale. Instead the drawings are intended so as to indicate to those skilled in the art to which this invention pertains the preferred nature of construction involved. Obviously a number of changes in the structure shown can be made without departing from the scope of this disclosure.

As an aid to understanding this invention it may be stated in essentially summary form that the invention itself is primarily concerned with digital readout devices, each of which devices is formed so as to include: support means; a rotatable shaft held adjacent to said support means; a first readout member secured to this shaft so as to rotate therewith, said first readout member being located adjacent to said support means; a second readout member rotatably mounted adjacent to said support means and to said first readout member; means for turning said second readout member a given amount for each complete rotation of said first readout member; and electrical means disposed upon said support means and said readout member whereby as said shaft is turned an electrical value is adjusted.

Various other individual aspects of the present invention are considered to be of separate utility in various modified readout devices, and hence are set forth separately in the appended claims. Certain of these aspects of the invention are not indicated in the above brief summary, but instead are described below.

In Fig. 1 of the drawings there is shown a complete digital readout device 10 of the invention which includes a base 12 having attached to the front end thereof an upstanding end member 14. Attached to the base 12 are three non-conductive supports 16, 18, and 20, each of which is provided with a centrally located aperture 22 (Fig. 2). A rotatable shaft 24 is carried within these three apertures and within another aperture (not shown) in the end member 14. The shaft 24 is adapted to be connected to any convenient source of torque used to operate the device such as, for example, a servomotor or the like, although it can be rotated by hand.

Positioned around the shaft 24 between the end member 14 and the support 16 is a small collar or cylinder 26 of nonconductive material. Located about it is a metal sleeve 28 serving as a slip ring so that as the shaft 24 is turned, current may be conveyed from a terminal 30 through a resilient metal brush 32 to a resilient metal contact arm 34. This contact arm 34 is attached to a flange 36 formed on the metal sleeve 28 so as to project therefrom. In essence it is operatively secured to a first non-conductive readout wheel 38 positioned around the sleeve 28 since the wheel 38, the sleeve 28, and the collar 26 are all secured together so as to rotate together with the shaft 24.

The contact arm 34 is designed so as to engage any of a series of contacts identified as C-0 to C-9 on the first support 16 as shown in Fig. 2 of the drawings.

Thus the end of the contact arm 34 moves in a circle A shown in dotted lines in Fig. 2 so as to engage these contacts. Small printed circuit resistors 40 are disposed on the support 16 between the various contacts identified above and after the contact C–9. This has the effect of creating upon the support 16 a series of separate resistance elements connected together in series. The end resistance elements or resistors of this arrangement are connected to terminals 42 and 44 which project through the first support 16 to the rear side thereof where they are connected to two resilient metal contact arms 46 and 48 normally bearing against slip rings 50 and 52 formed as by printed circuit techniques on the front surface of a second non-conductive readout wheel 54. These two slip rings are connected as shown in Fig. 3 of the drawings by short conductive strips 56 to other terminals 42 and 44 projecting through the second readout wheel 54 to resilient metal contact arms 58 and 60.

These contact arms 58 and 60 project so as to engage contacts C–0 to C–11 formed on the front surface of the second support 18. This front surface of the second support 18 is identical with the surface of the support 16 shown in Fig. 2 of the drawings except for the inclusion thereon of the terminals C–10 and C–11 and resistors 40 and the connection of the terminal 44 to the terminal C–11 instead of the terminal C–9 as shown in dotted lines in Fig. 2. With this construction the contact arm 58 moves in what is identified as a circle A shown in dotted lines in Fig. 2, while the contact arm 60 moves along the support 18 in the path identified by the circle B shown in dotted lines in Fig. 2. From an examination of this second figure of the drawings it will be apparent that the contact arm 58 during rotation of the second wheel 54 never touches the contacts C–10 and C–11, while the contact arm 60 never touches the contacts C–0 and C–1. On the second support 18 the terminal 44 is connected as indicated in Fig. 2 by dotted lines to the contact C–11 instead of the contact C–9.

The terminals 42 and 44 on the second support 18 are connected to contact arms 46 and 48 which bear against slip rings 50 and 52 formed on the front surface of a third non-conductive readout wheel 62. This third readout wheel is identically constructed to the second readout wheel 54 so that contact arms 58 and 60 projecting therefrom move with respect to the third support 20 in order to bear against contacts C–0 to C–11 formed thereon in the identical manner which the contacts are formed on the second support 18. The terminals 42 and 44 on the third support 20 are not attached to any contact arm, but instead are designed to be connected directly to an appropriate source of electrical current.

On the external surface of all three of the readout wheels 38, 54, and 62 there are provided members which can be used to indicate the positions of these wheels and continuous cam surfaces or grooves 64. Each of these cam surfaces is designed to be engaged by a small wheel 66 rotatably mounted on a support member 68. The support members 68 project from small housings 70 and are normally held against the cam surfaces 64 through the use of springs 72 located within cavities 74 in the housings 70. The cam surfaces 64 are designed so as to have low spots 76 corresponding to the numbered locations of the readout wheels 38, 54, and 62 when these wheels are positioned so that the contact arm 34 and the contact arms 76 are in engagement with any of the contacts C–0 to C–11 previously described. Thus with this construction the force of the springs 72 causing the wheel 66 to move against the cam surfaces 64 will prevent any of the wheels 38, 54, or 62 from stopping at a location where the contact arms 34, 46, or 48 are not in direct engagement with the contacts C–0 to C–11. This has the effect of preventing bridging between two different contacts by the contact arms or of preventing the contact arms being located between two contacts, depending upon the size and shape of the contacts and contact arms.

Formed on the rear surface of the first wheel 38 is a small gear segment 78 which is adapted to hit against a gear 80 formed on one end of a spool 82 causing this spool 82 to rotate. This rotation is transmitted through the spool 82 to another gear 80 which coacts with a continuous gear 84 on the second readout wheel 54 causing the second readout wheel to rotate a small amount for each complete revolution of the first readout wheel 38. Another small segmental gear 78 is provided on the rear surface of the second readout wheel 54. This second segmental gear 78 acts through gears 80 of another spool 82 to cause the third readout wheel 62 to rotate a fraction of a circle for each complete rotation of the second readout wheel 54.

The spools 82 are carried upon a shaft 86 supported by the end member 14 and the third support 20. The spools 82 project through openings 88 in the first and second supports 16 and 18. With the preferred embodiment of the invention the sizes of the gears 78, 80, and 84 are so proportioned that for each complete turn of the first wheel 38, the second wheel 54 is turned one tenth of a complete turn or 36°. The same proportional relationships are employed with the second and third wheels 54 and 62 so that each time the wheel 54 turns a complete turn the wheel 62 is turned 36°.

From an examination of Fig. 2 of the drawings it will be seen that the contacts C–0 to C–11 on the supports 16, 18, and 20 are spaced with respect to one another by an amount corresponding to 36° of a circle. Further these contacts are so located as to correspond to the low spots 76 in the cam surfaces 64. The contact arms 58 and 60 are further located with respect to one another so as to bear against contacts which are removed by one contact from one another regardless of the positions of the wheels 54 and 62.

The purpose of this type of construction is best seen with reference to Fig. 4 of the drawings. Here the various contacts and resistors on each of the supports 16, 18, and 20 are diagrammatically shown along with the contact arm 34 and the contact arms 58 and 60. As will be recognized the positions of any of these contact arms may be varied so as to obtain satisfactory measurements when using the digital readout device 10 in the intended manner in the calibration of a potentiometer.

All of the resistors 40 are preferably of the same resistance values; all of the resistors 40 on the second support 18 are preferably of equal resistance value; further all of the resistors 40 on the third support 20 are preferably of equal resistance value. Also the values of the resistors 40 are so proportioned with respect to one another so that when two of the resistors upon the second support 18 are connected in parallel with all the resistors upon the first support 16 during operation of the device 10 the effective value of this arrangement is equal to the resistance of any one of the resistors 40 upon the second support 18. The same arrangement is carried out with respect to the values of the resistors 40 on the second and third supports 18 and 20. These proportional values between the various resistors can be best explained by giving operative values to these resistors. Thus each of the resistors 40 on the first support 16 may have a resistance of 8 ohms; each of the resistors 40 on the second support 18 may have a resistance of 40 ohms; and each of the resistors 40 upon the third support 20 may have a resistance of 200 ohms.

The reason for the spacing of the contacts C–9, C–10 and C–11 on the supports 18 and 20 is quite clearly seen from a detailed examination of Fig. 4 of the drawings where the circuit employed in the digital readout device 10 is illustrated. This spacing is necessary in order to provide a series of 12 resistors on these supports so that these 12 resistors may be utilized with only 10 positions or stops of the supports. In order to achieve this result, it is necessary that the contact arms 58 and 60 move in different circles as indicated so that the innermost contact arm is the only arm capable of engaging contacts C-10 and C-11.

In Fig. 5 of the drawings, a modification of the invention is shown utilizing substantially the identical operative structure described before with respect to the device 10. This modification of the invention is designed so that current may be applied to a slip ring 90 around any of the readout wheels such as the readout wheel 54 illustrated from a brush attached to a non-conductive block 94 mounted upon the base 12. From the slip ring 90 there projects a contact arm 96 which is adapted to engage any of a series of contacts 98 located on the adjacent support 18. Terminals 100 are attached to these various contacts 96. With this construction, current may be supplied selectively to any of the terminals 98 in order to actuate exterior circuits such as, for example, lighting circuits in order that the position of the support wheel 54 may be determined other than visually. Obviously, the same structure can be employed on all of the support wheels utilized. In Figs. 6, 7, and 8 of the drawings, a modified digital readout device 150 of the invention is shown which differs from the device 10 primarily in that it is a very thin construction which may be readily mounted on the side of a cabinet or other apparatus. In Fig. 6 of the drawings a front view of this device 150 is shown which illustrates that numbers corresponding to the positions of first, second and third readout wheels 152, 154 and 156 are disposed upon the peripheries of these wheels. All three of the wheels are in effect mounted upon a non-conductive support 158; the first readout wheel is held adjacent to this support and spaced from it upon a shaft 160 which is used to actuate the entire device. The second and third wheels 154 and 156 are rotatably mounted parallel to the support 158 on other shafts 162.

Generally between the first readout wheel 152 and the second readout wheel 154 there is formed upon a shaft 164 a connecting wheel 166 having formed therein slots 168 in the conventional Geneva Cross pattern. Thus, with this construction, when the first readout wheel 152 is turned a complete turn a pin 170 upon the periphery of this first wheel engages one of the slots 168 causing the connecting wheel 166 to turn. This has the result through engagement of another slot 168 on the connecting wheel 166 with any of a series of pins 172 upon the second readout wheel 154 of turning this second readout wheel 154 a given amount such as in the arrangement shown ⅒ of a turn of a complete circle for each complete turn of the first readout wheel 152.

A similar connecting wheel 174 is mounted so as to connect the second and third readout wheels 154 and 156. It is noted that pins 170 and 172 on the opposite side of the second readout wheel 154 from the pins 172 are used to turn the connecting wheel 174 and the third readout wheel 156. This staggering of the connecting wheels 166 and 174 from the plane of the three readout wheels 152, 154 and 156 is necessary in order that the pins used in the operation of the connecting wheels will not interfere with the operation of each separate connecting wheel.

Upon the side of the first readout wheel 152 adjacent to the support 158 there is located an arcuate resistance strip 178. This resistance strip 178 is centered about the shaft 160 and extends for an arc of 324° of a circle with the preferred construction. The ends of this resistance strip are connected to circular slip rings 180 and 182 by means of short conductive connecting strips 184. The slip rings 180 and 182 and the connecting strips 184 may be conveniently formed by conventional printed circuit techniques. In order to avoid insulating the resistance strip 178 and these slip rings 180 and 182 and connecting strips 184 from the readout wheel 152 it is preferable to form this readout wheel of any suitable non-conductive material such as, for example, a phenolic plastic. It is also preferred for the same reason to form the other readout wheels 154 and 156 of the same material.

Mounted upon the support 158 are terminals 186 which are adapted to be connected to spring contact arms 188 which are designed to resiliently engage the resistance strip 178 and the slip rings 180 and 182 as the shaft 160 is turned. The two terminals 186 which engage the contact arms 188 bearing against the slip rings 180 and 182 are designed to be connected to other terminals 186 positioned upon the support 158 adjacent to the second readout wheel 154 by conventional means such as, for example, wire leads. Attached to these terminals 186 adjacent to the second readout wheel 154 are contact arms 188 which are designed to bear against contacts 190 located in A and B rings, upon the side of the second readout wheel 154 adjacent to the strip 158. These contacts are connected through the use of metallic inserts 192 (note Fig. 6) to electrically conductive strips 194 located on the side of the readout wheel 154 remote from the strip 158.

These conductive strips 194 tap onto or overlay portions of arcuate printed circuit resistors 196 positioned on the same side of the second readout wheel in the manner best shown in Fig. 7 of the drawings. It will be realized by those studying this specification that this manner is essentially the same as those illustrated in Fig. 3 of the drawings. The end conductive strips 198 and 200 are connected through other metal inserts such as the inserts 192 to circular slip rings 202 and 204 on the readout wheel 154 as shown in the drawings. The two slip rings 202 and 204 are designed to be engaged by contact arms 188 attached to other terminals 186 so that they, in turn, may be electrically connected by means of wires or other equivalent means to other terminals 186 disposed upon the support 158 adjacent to the third readout wheel 156.

Thus, with this construction, the end of the slip rings 202 and 204 may be connected to contact arms 188 which are designed to engage contacts 190 formed upon the third readout wheel 156. The construction of this third readout wheel is substantially identical to the construction of the second readout wheel 154 previously described and hence will not be explained in detail. Slip rings 202 and 204 upon this third readout wheel 152 are designed to be engaged by contact arms 188 connected to other terminals 186 which are used connecting the entire device into an electrical circuit.

From a careful consideration of the construction shown in Figs. 6, 7 and 8 of the drawings it will be realized that the operation of this device 150 is substantially identical with that of the device 10 except that different means are provided to turn the consecutive readout wheels with respect to one another at given intervals. Further, with the device 150 the first readout wheel contains instead of the means previously described what, in effect, is a rotary potentiometer enabling this first readout wheel to be used with great accuracy, particularly if a vernier arrangement is used with it. The values of the various resistors 196 and of the resistance strip 178 are preferably proportioned as in the device 10.

A second modified digital readout device 210 is shown in Figs. 9 and 10 of the drawings. This construction differs from that previously described in that it is of a flat pancake-like shape employing a series of rings concentrically located about a center shaft 212 which is used to actuate the entire construction. With the device 210 there is employed a base 214 which is preferably formed of a non-conductive material such as, for example, phenolic resin. Around this base there is located a first spacer ring 216 having formed thereon an internal groove 218 which is adapted to support a flange 220 upon the third readout ring 222. A similar flange 220 is provided on the inside of this third readout ring 222 in such a manner that this flange is carried within a groove 218 in a second spacer ring mounted upon the base 214. This second spacer ring is also provided with an interior groove 218 which carries another flange 220 upon a second readout ring 226. This second readout ring, in turn, carries an internal flange 220 which is supported within another groove 218 in a third spacer ring 228. On the inside of this third spacer ring 228 there is provided still another groove 218 which is adapted to carry a flange 220 upon a centrally located first readout ring 230. All of the spacer rings 216, 224 and 228 and the readout rings 222, 226 and 230 are preferably formed of the same material as the base 216. It is readily seen from the construction shown that the various readout rings are spaced from the base 214 with this construction in such a manner that these rings may be rotated with respect to this base.

The actual rotation accomplished is secured through rotation of the shaft 212 causing the first readout ring 230 attached to this shaft to rotate. On the outside of the first readout ring 230 there is provided a small gear segment 232 which is adapted to engage a gear 234 mounted upon a shaft 236 in a partial opening 238 in the third spacer ring 228. This shaft 236 is preferably secured to the base 214 as indicated. The gear 234 is in direct engagement with a complete ring gear 240 formed upon the inside of the second readout ring 226. On the outside of the second readout ring 226 there is provided another gear segment 232 which is adapted to turn a gear 234 held upon a shaft 236 within a partial opening 238 in the second spacer ring 224. This gear 234 mounted in the spacer ring is in constant engagement with a ring gear 240 on the inside of the third readout ring 222. From a consideration of the above it will readily be realized that rotation of the shaft 212 causes the first readout ring 230 to rotate at the same rate as this shaft, and causes the second and third readout rings 226 and 222 to rotate periodically depending upon the rotation of the first readout ring 230.

A terminal 242 is positioned so as to project through the base 214 where it is attached to a contact arm 244 which is adapted to engage a slip ring 246 formed upon the side of the first readout ring 230 adjacent to the base 214. As is shown in Fig. 10 of the drawings this slip ring 246 is connected by a small metal jumper or insert to a contact arm 250 which projects from the first readout ring 230 so as to engage an arcuate resistance strip 252 formed upon the base 214. This arcuate resistance strip is similar to the resistance strip 178 previously described, and the ends of it are connected by means of wires 254 to terminals 256 mounted upon the base 214 so as to project therethrough.

These terminals 256 are attached to contact arms 258 which engage circular slip rings 260 formed upon the second readout ring 226. Small metal inserts 262 connect each of these two slip rings 262 to a contact arm 264 mounted upon the second readout ring 226. The two contact arms 264 thus move in two different circles about the shaft 212 so as to engage either of two arcuate resistance strips 266 or 268. The adjacent end of these resistance strips are connected together by means of a conductive jumper 270 and portions of the resistance strip 268 are overlaid by conductive strips 272 extending so as to be engaged by the contact arm 264 designed to engage the resistance strip 266. It will be realized from a consideration of this description and the drawings that this is essentially the same arrangement as is shown in Fig. 3 of the drawings and as is shown in Fig. 7 of the drawings with the other two constructions of the invention previously described.

The same arrangement is also carried forth with respect to the third readout ring 222. For convenience the precise parts involved with this third readout ring 222 are identified with the same numbers used with respect to the other readout ring 226. Wires 274 leading from the ends of the resistance strips 226 and 268 electrically remote from one another are used along with the terminal 242 to connect the device 210 in to an electrical circuit. All of the various conductive resistance members previously described, as well as the slip rings indicated, may be conveniently formed by printed circuit techniques. The use of contact arms as described, metal inserts, etc., is considered to be essentially of a conventional nature and hence the manner in which these inserts and contact arms are mounted is not described in this specification.

From the aforegoing description it is considered obvious that because of the nature of this invention it is to be afforded comparatively wide latitude; it is to be considered as limited only by the appended claims. Those skilled in the art to which the invention pertains will realize that a large number of modifications may be made in the invention without departing from the essential nature of the inventive concept herein described. Turning means such as are shown in Fig. 5 of the drawings may be easily incorporated into either of the modified devices 150 or 210. With the devices 10 and 150 it is normally desired to use a conventional housing having a window formed therein so that the position of the various readout wheels for a given value may be visually determined through such windows.

The resistors employed with all modifications of the invention can be disposed upon either the readout wheels or upon the support members utilized by a minimum of modification or adaptation. Further, it is possible to substitute for the various resistors indicated precision wire wound resistors or other resistors of a category known to the art, although such substitution is not as a rule preferred because the printed circuit type resistors shown are very easily formed. By appropriate modification of the devices 150 and 210 it is possible to incorporate means such as are shown in conjunction with the device 10 in order to prevent either the first or all of the readout wheels shown from stopping in other than a desired position.

Because the essential features of this invention are susceptible to broad modification this invention is to be considered as being limited only by the appended claims.

We claim:

1. A new and improved digital readout device which includes: a base; a rotatable shaft supported above said base; a first readout wheel having front and rear sides secured to said shaft so as to rotate therewith; a first support having front and rear sides attached to said base so as to be located with its front side adjacent the rear side of said first readout wheel; a second readout wheel having front and rear sides rotatably mounted on said shaft with the front side of said second readout wheel positioned adjacent said rear side of said first support; a second support having front and rear sides attached to said base with its front side located adjacent said rear side of said second readout wheel; means for turning said second readout wheel through an angle of less than 360° when said shaft is rotated through an angle of 360°, causing said first readout wheel to be rotated through an angle of 360°; contact means located on the front sides of said supports; contact arm means secured to the rear sides of said readout wheels, said arm means engaging certain of said contact means depending on the position of said readout wheels; electrical means connecting said contact means on said first support with said contact arm means on said second readout wheels; and means for supplying current to said contact arm means on said first readout wheel.

2. A digital readout device as defined in claim 1 wherein said contact means on said supports are connected by electrical resistors.

3. A digital readout device as defined in claim 1 including means for preventing said readout wheels from stopping in a position in which said contact arm means are not in engagement with said contact means.

4. A digital readout device as defined in claim 1 wherein said means for turning comprise: segmental gear means located on said first readout wheel: continuous gear means located on said second readout wheel; a rotatable member mounted adjacent to said first and second readout wheels, said rotatable member including gear means engaging said continuous gear means and adapted to engage said segmental gear means once each time said first readout wheel is rotated through an angle of 360°.

5. In a device having a rotatable shaft, a series of wheels mounted on said shaft, the first of said wheels being secured to said shafts and the rest of said wheels being rotatable thereon, and means for turning said wheels of said series other than the first of said wheels in accordance with the rotation of the first of said wheels, the improvement which comprises: a cam surface formed on the periphery of each of said wheels; and means engaging each of said cam surfaces, said means being spring biased toward said cam surfaces whereby said wheels are prevented from coming to rest at other than desired positions.

6. A construction as defined in claim 5 wherein each of said means includes a wheel rotatably mounted so as to engage a cam surface.

7. In a device of the class described: a support; a plurality of contact members located upon said support in a circle, said contact members being spaced from one another; a wheel located adjacent to said contact member so as to have its center opposite the center of said circle; means for rotating said wheel; a slip ring mounted so as to rotate with said wheel; a brush mounted so as to engage said slip ring as said wheel is rotated; a contact arm connected to said slip ring so as to rotate with said wheel in order to engage one of said contact members at a time; a cam surface formed on the outside of said wheel; and means resiliently engaging said cam surface so as to prevent said wheel from stopping with said contact arm in other than a desired position.

8. A device as defined in claim 7 wherein said means includes: a wheel engaging said cam surface; a member rotatably supporting said wheel; and spring means forcing said member and said wheel toward said cam surface.

References Cited in the file of this patent

UNITED STATES PATENTS

| | | |
|---|---|---|
| 1,231,632 | Miller et al. | July 3, 1917 |
| 1,678,892 | Wiegand | July 31, 1928 |
| 2,670,422 | Baum et al. | Feb. 23, 1954 |